United States Patent
Hassell et al.

(12) United States Patent
(10) Patent No.: US 9,982,799 B2
(45) Date of Patent: May 29, 2018

(54) HYDRAULIC ASSEMBLY FOR A MINING SYSTEM

(71) Applicant: Catepillar Global Mining Europe GmbH, Lünen (DE)

(72) Inventors: James Hassell, Meadow Lands, PA (US); Jens Titschert, Lünen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 44 days.

(21) Appl. No.: 15/065,267

(22) Filed: Mar. 9, 2016

(65) Prior Publication Data

US 2016/0265685 A1     Sep. 15, 2016

(30) Foreign Application Priority Data

Mar. 13, 2015 (EP) .................................... 15159084

(51) Int. Cl.
| | |
|---|---|
| *F16K 37/00* | (2006.01) |
| *E21D 15/58* | (2006.01) |
| *E21D 23/00* | (2006.01) |
| *E21D 23/16* | (2006.01) |
| *E21D 23/26* | (2006.01) |
| *G01M 3/00* | (2006.01) |

(52) U.S. Cl.
CPC ........ *F16K 37/0083* (2013.01); *E21D 15/585* (2013.01); *E21D 23/006* (2013.01); *E21D 23/16* (2013.01); *E21D 23/26* (2013.01); *G01M 3/002* (2013.01)

(58) Field of Classification Search
USPC ..................................................... 137/15.11
See application file for complete search history.

(56) References Cited

U.S. PATENT DOCUMENTS 3,921,435 A * 11/1975 Howard .................. F04B 49/10
374/5
3,938,544 A *  2/1976 Bernaerts .................. F16K 5/00
137/334

(Continued)

FOREIGN PATENT DOCUMENTS

CN       201065761       5/2008
CN       201982093       9/2011
(Continued)

OTHER PUBLICATIONS

European Search Report dated Sep. 14, 2015, in European Patent Application No. EP 15159084 (2 pages).

*Primary Examiner* — John Fox

(57) ABSTRACT

A hydraulic assembly for a mining system is disclosed. The hydraulic assembly may have at least one control valve for controlling a supply of hydraulic fluid to a hydraulic actuator of the mining system. The hydraulic assembly may also have at least one temperature sensor associated with the at least one control valve. The at least one temperature sensor may be configured to measure a temperature of the at least one control valve. In addition, the hydraulic assembly may have a control unit in communication with the at least one temperature sensor. The control unit may be configured to receive the temperature measured by the at least one temperature sensor. The control unit may also be configured to determine that a leakage has occurred in the at least one control valve based on the temperature.

14 Claims, 2 Drawing Sheets

(56) References Cited

U.S. PATENT DOCUMENTS

| | | | | |
|---|---|---|---|---|
| 4,265,117 A | * | 5/1981 | Thoma | G01K 1/143 |
| | | | | 136/221 |
| 4,906,143 A | * | 3/1990 | Kussel | E21D 23/16 |
| | | | | 405/299 |
| 5,883,815 A | | 3/1999 | Drakulich et al. | |
| 7,031,851 B2 | * | 4/2006 | Sherikar | F17D 5/02 |
| | | | | 702/51 |

FOREIGN PATENT DOCUMENTS

| | | | | |
|---|---|---|---|---|
| DE | 4416643 | | 11/1995 | |
| JP | H06-134833 | | 5/1994 | |
| JP | H10-169616 | * | 6/1998 | F15B 20/00 |
| WO | WO 2011/153985 | | 12/2011 | |

\* cited by examiner

HYDRAULIC ASSEMBLY FOR A MINING SYSTEM

CLAIM FOR PRIORITY

This application claims benefit of priority of European Patent Application No. EP 15159084.1, filed Mar. 13, 2015, which is incorporated herein by reference.

TECHNICAL FIELD

The present disclosure generally relates to a hydraulic assembly for a mining system, in particular, an electro-hydraulic valve assembly comprising a plurality of hydraulic control valves.

BACKGROUND

In underground mining systems, various hydraulic assemblies are used, for example, for controlling hydraulic functions of shields of roof supports used in underground longwall mining. For example, an underground self-advancing roof support system may include electro-hydraulic valve blocks, each valve block being provided with a plurality of hydraulic control valves. Each control valve is controlled by an actuator mounted on the valve block. It is common to use control valves and actuators that have an identical configuration in the valve blocks of all shields such that, in case of a failure, a control valve or an actuator can easily be replaced. The control valves may control a hydraulic pressure in the cylinders or props forming the hydraulic components of the shield of the self-advancing roof support system.

The disclosed systems and methods are directed at least in part to improving known systems.

SUMMARY OF THE DISCLOSURE

In one aspect, the present disclosure relates to a hydraulic assembly for a mining system. The hydraulic assembly comprises at least one control valve for controlling a supply of hydraulic fluid to a hydraulic actuator of the mining system. At least one temperature sensor is associated with the at least one control valve and configured to measure a temperature of the at least one control valve. A control unit is in communication with the at least one temperature sensor. The control unit is configured to receive the temperature measured by the at least one temperature sensor, generate an output signal on the base of the received temperature, and output the output signal.

In another aspect, the present disclosure relates to a method of detecting a leakage in a hydraulic control valve of a mining system. The method comprises detecting a temperature associated with the control valve, detecting an ambient temperature, and comparing the temperature associated with the control valve to the ambient temperature to to determine a temperature difference. The method further comprises determining that a leakage has occurred in the control valve when the temperature difference is greater than a predetermined first threshold.

Other features and aspects of the present disclosure will be apparent from the following description and the accompanying drawings.

DETAILED DESCRIPTION

Figure 1:
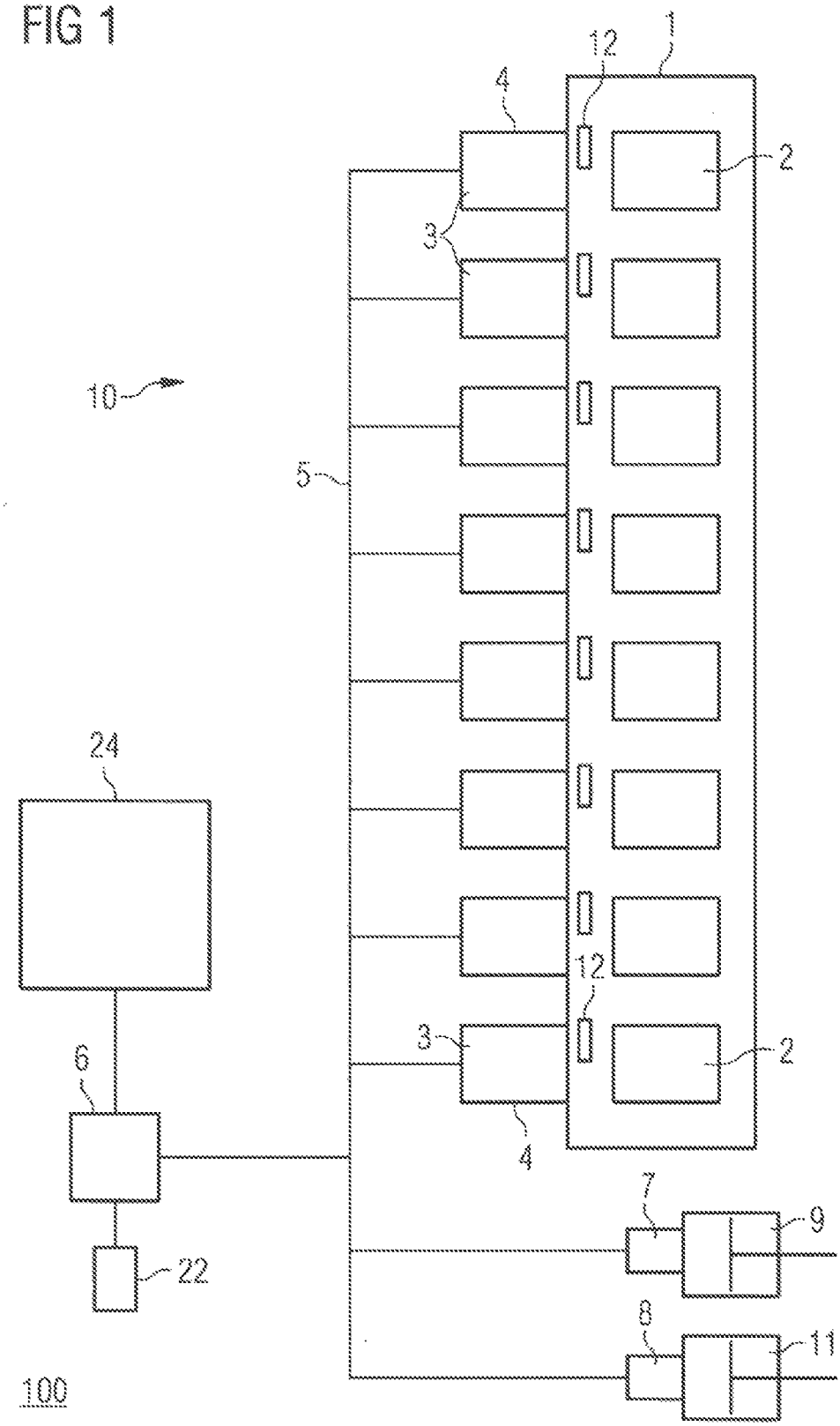
FIG. 1 shows a schematic overview of a hydraulic assembly for a mining system according to an exemplary embodiment.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as a limiting description of the scope of protection. Rather, the scope of protection shall be defined by the appended claims.

The present disclosure may be based in part on the realization that a leakage may occur in a control valve of an electro-hydraulic assembly used in underground mining. For example, such a leakage may occur in one of a plurality of control valves installed in a valve block that is used to control hydraulic functions of a self-advancing roof support system used in underground mining. These leakages are commonly identified by detecting noise generated when the leakage occurs in a control valve. Such leakages may result in a pressure drop in the hydraulic system, which may affect operation of the system. In the long run, individual hydraulic functions may fail, and parts of the hydraulic system may even be destroyed. While the occurrence of a leak may be detected by detecting the noise generated due to the leakage, it may be difficult to accurately identify which control valve has the leakage. Generally, the leaking control valve is identified using a stethoscope. Alternatively, differential pressure or flow rate measurements may be performed on all control valves. However, this requires the use of expensive sensors, and the measurements can only be performed while the system is not in use. In addition, such measuring assemblies will influence the hydraulic circuit, because they are always present in the hydraulic system.

Accordingly, the present disclosure may be based in part on the realization that use of a common temperature sensor may allow detecting a leak by detecting temperature increase in the vicinity of a control valve, which temperature increase is generated due to friction when hydraulic fluid passes the malfunctioning portion of the control valve. The use of temperature sensors is cost effective and does not affect operation of the hydraulic circuit.

The present disclosure may further be based in part on the realization that, in case electrically actuated control valves are used, a valve control unit associated with the control valve may be used to evaluate the signals from the temperature sensor. In particular, signal lines that are used for transmitting control signals for actuation of an electro-hydraulic actuator of the control valve can be used to transmit the temperature detected by the temperature sensor to a central control unit connected to different control valves. An ambient temperature sensor that detects an ambient temperature and is not affected by temperatures in the hydraulic system may be connected to the central control unit. The central control unit may compare the temperature of each hydraulic control valve with the ambient temperature. While a small temperature difference may be normal, the central control unit may determine that a leakage has occurred in a control valve when the temperature difference between the temperature detected by the temperature sensor associated with the control valve and the ambient temperature exceeds a predetermined threshold. In particular, the temperature of each control valve may be continuously monitored by the control unit, and an increase in a temperature difference may indicate that a leakage is starting to occur in the control valve.

In addition, the present disclosure may be based on the realization that the central control unit connected to all control valves of the hydraulic system may communicate information relating to any leakages occurring in the control valves to the outside, for example, to a central monitoring system. For example, such a central monitoring system may be configured to monitor the complete mining system, for example, a plurality of shields used in long-wall mining applications. In this manner, leakages occurring in the system may be determined early, and necessary spare parts may be acquired and a repair of the system may be scheduled.

Referring now to the Figures, FIG. 1 shows a schematic overview of an exemplary embodiment of a hydraulic assembly 10 for a mining system 100. Mining system 100 may, for example, be a shield for a typical underground self-advancing roof support system. Hydraulic assembly 10 is used to control hydraulic functions associated with the self-advancing roof support system, for example, hydraulic lifting props 9, 11 of the shield, which are schematically shown in FIG. 1.

Hydraulic assembly 10 comprises a valve block 1 which is fitted with a total of eight hydraulic control valves 2. Each hydraulic control valve 2 may be seated in an appropriate receiving hole and may activate a different function associated with mining system 100. Control valves 2 are identical to each other and are arranged in groups in valve block 1. An actuator 3 is associated with each control valve 2. The actuator may be disposed, for example, on valve block 1 and may be mounted to the same. Each actuator 3 includes a housing 4 in which an electromagnet or a piezo element (not shown) configured for actuating the associated control valve 2 is disposed. Actuators 3 are also configured to be identical to each other, and are connected via signal lines 5, for example, via a BUS, to an electronic control unit 6. Further, actuators 3 are connected to a power supply (not shown). Control unit 6 is configured to provide a control signal for actuating the plurality of control valves 2 in accordance with a desired movement of the associated hydraulic functions. Sensors 7, 8 associated with hydraulic lifting props 9, 11, respectively, also transmit signals to control unit 6 via signal line 5. In this manner, a state of lifting props 9, 11 can be determined by control unit 6.

Hydraulic assembly 10 further comprises a plurality of temperature sensors 12. Each temperature sensor 12 is associated with one of the plurality of hydraulic control valves 2 and is configured to measure a temperature of the associated control valve. Temperature sensor 12 may be any known temperature sensor, for example, of the type PT100. In the exemplary embodiment shown in FIG. 1, each temperature sensor 12 is mounted in valve block 1 and thermally coupled to the associated control valve 2 via a material of valve block 1, for example, a metal or the like. Each temperature sensor 12 is in communication with control unit 6 via signal line 5. Control unit 6 is configured to receive the temperature detected by each temperature sensor 12, and to generate an output signal on the basis of the received detection results.

In particular, control unit 6 is in communication with an ambient temperature sensor 22 that is disposed at a location where it is not influenced by temperatures in the hydraulic system, for example, at a location away from valve block 1 and control valves 2. Control unit 6 is configured to obtain an ambient temperature from ambient temperature sensor 22, and compare the ambient temperature to the temperature measured by temperature sensors 12. An output signal generated on the basis of the comparison is output to a monitoring system 24 in communication with control unit 6.

In the example shown in FIG. 1, control unit 6 is configured to compare a temperature received from one of the plurality of temperature sensors 12 with the ambient temperature, and determine that a leakage has occurred in the associated control valve 2 when a temperature difference is greater than a predetermined first threshold. In addition or as an alternative, control unit 6 may be configured to compare the temperature measured by each temperature sensor 12 to the ambient temperature at regular intervals, and determine that a leakage has occurred in a control valve 2 when an average increase of the temperature difference between the temperature of the control valve and the ambient temperature over time is greater than the a predetermined second threshold. The first threshold and/or the second threshold may be set or adjusted in accordance with different operating conditions, system parameters and/or environmental parameters associated with mining system 100. For example, the first and/or second threshold may be set by an operator, or may be set automatically, in accordance with an ambient temperature, a type of hydraulic fluid used, a hydraulic pressure and the like.

Control unit 6 may output an output signal identifying a hydraulic leakage in at least one control valve 2 to monitoring system 24. For example, control unit 6 may communicate information identifying the at least one control valve 2 having the leakage to leakage monitoring system 24. The information may include, for example, a location of the at least one control valve 2 having the leakage, a type or serial number of the at least one control valve, or any other appropriate identifier. Monitoring system 24 may be used by an operator to identify any leakages occurring in hydraulic assembly 10. For example, monitoring system 24 may be configured as a computer or a computer system including a display or the like for indicating which hydraulic control valve 2 has developed a leakage. In some embodiments, leakage monitoring system 24 may be an automated system that automatically and periodically requests information from control unit 6 and determines whether a leakage has occurred in hydraulic assembly 10.

Figure 2:
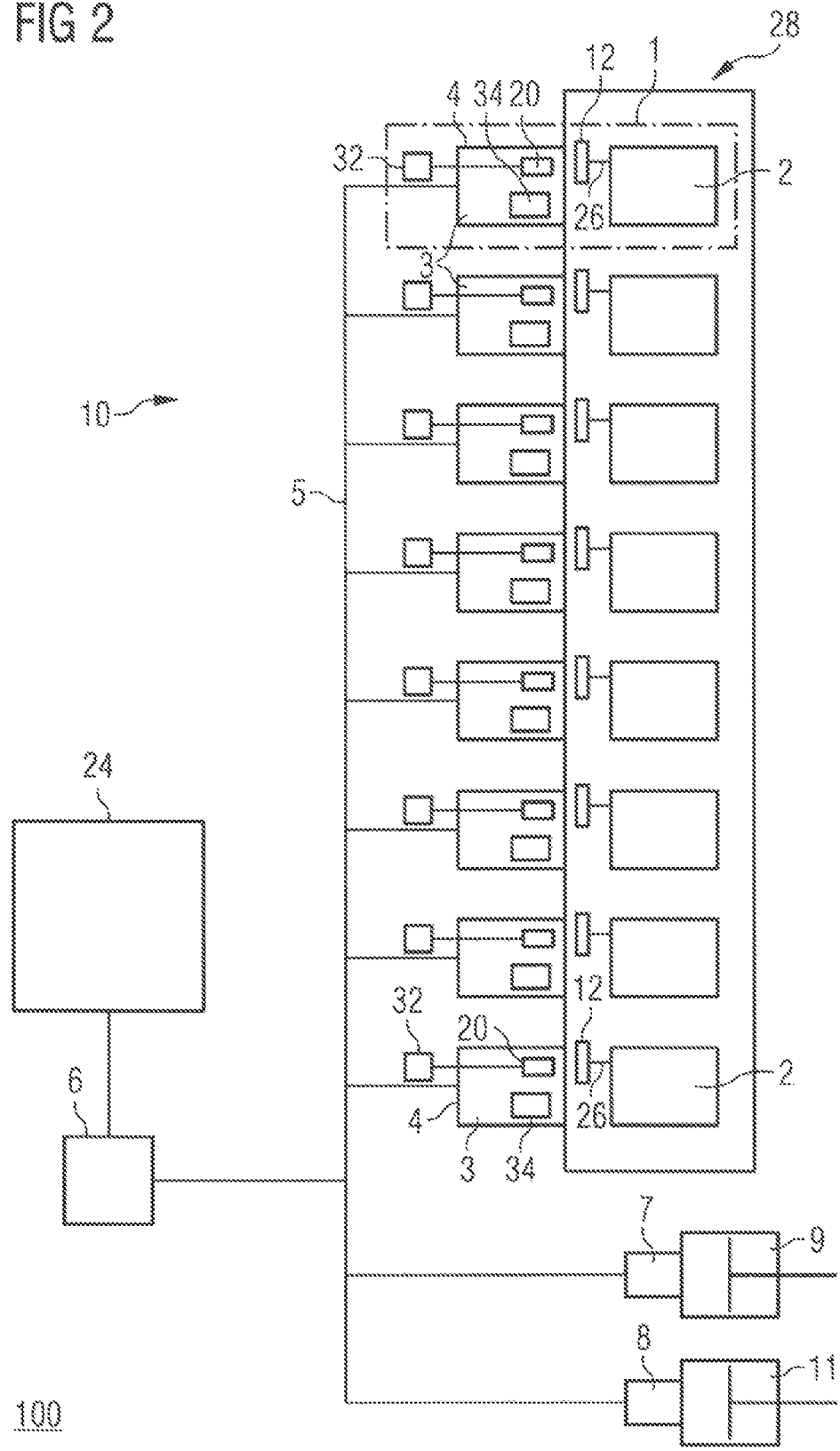
FIG. 2 shows a schematic overview of another exemplary embodiment of a hydraulic assembly for a mining system.

Referring now to FIG. 2, another exemplary embodiment of hydraulic assembly 10 in accordance with the present disclosure is shown. The embodiment shown in FIG. 2 is configured in a similar manner to the embodiment shown in FIG. 1, and like elements are denoted by like reference signs.

The embodiment shown in FIG. 2 differs from the embodiment shown in FIG. 1 in that each temperature sensor 12 is directly thermally coupled to the associated control valve 2 via a thermally conductive connection element 26. Connection element 26 has a higher thermal conductivity than the material forming valve block 1. For example, thermally conductive element 26 may include a metal such as copper of aluminium, or may be a thermal paste connecting temperature sensor 12 to control valve 2

Further, in the embodiment shown in FIG. 2, each actuator 3 includes an actuator control unit 20 configured to control actuation of the associated control valve 2. A power supply 34 is associated with each actuator 3 and configured to supply electric power to at least one of actuator control unit 20, actuator 3 and temperature sensor 12. Further, a control valve ambient temperature sensor 32 is associated with each actuator 3 and configured to determine an ambient temperature in the vicinity of actuator 3. Control valve ambient temperature sensor 32 is disposed at a location where it is not influenced by the temperature of associated control valve 2, and may also be supplied with power from power supply 34.

In the embodiment shown in FIG. 2, control valve 2, temperature sensor 12, actuator 3, actuator control unit 20 and control valve ambient temperature sensor 32 are integrated in a control valve assembly 28 configured to be installed in mining system 100, in particular, in valve block 1. In this manner, control valve assembly 28 can easily be replaced, or can be retrofitted to an existing mining system 100.

In the embodiment shown in FIG. 2, control unit 20 associated with each control valve 2 is configured to receive the temperature of control valve 2 detected by the associated temperature sensor 12. Further, control unit 20 is configured to receive an ambient temperature in the vicinity of actuator 3 of associated control valve 2 from control valve ambient temperature sensor 32. Control unit 20 is configured to determine whether a leakage has occurred in the associated control valve 2 in the manner described above with respect to the embodiment shown in FIG. 1. The result of the determination is output by actuator control unit 20 to control unit 6 via signal line 5. Control unit 6 is again in communication with leakage monitoring system 24 in the above-described manner.

It will be readily appreciated that many modifications of the exemplary systems shown in FIGS. 1 and 2 are possible.

For example, although it is been previously described that a temperature sensor 12 is associated with each control valve 2, in other embodiments, a single temperature sensor 12 may be used for two or more control valves 2. In this manner, control unit 6 and leakage monitoring system 24 may determine that a leakage has occurred in a group of two or more control valves 2. Temperature sensor 12 may again be thermally coupled to the two or more control valves 2 via a material of valve block 1, or via corresponding connection elements 26.

Further, in some embodiments different components may be formed as a unit to be installed, for example, in valve block 1. For example, control valve 2 and the associated temperature sensor 12 may be configured as a replaceable unit, control valve 2, actuator 3 and temperature sensor 12 may be configured as a replaceable unit, or any other combination of control valve 2, actuator 3, temperature sensor 12, actuator control unit 20, control valve ambient temperature sensor 32 and power supply 34 may be configured as a replaceable unit to be installed in mining system 100, for example, to be retrofitted to en existing system. In some embodiments, power supply 34 may be omitted, and power may be supplied to each actuator 3 by other means. Further, control valve ambient temperature sensor 32 may be omitted, and the ambient temperature may be detected by control unit 6. In yet other embodiments, control unit 6 may not be in communication with temperature sensor 22, and may receive an ambient temperature from a different subsystem of mining system 100.

Although control valves 2 have been previously described as electrically actuated valves, for example, solenoid valves or other electromagnetic valves, in other embodiments, control valves 2 may be hydraulically actuated valves such as check valves or pressure release valves, or may be mechanically actuated valves. In these embodiments, actuator control unit 20 may be omitted. Likewise, power supply 34 and control valve ambient temperature sensor 32 may also be omitted.

In some embodiments, control unit 6 and/or control unit 20 may be configured to determine a degree of a leakage occurring in a control valve 2 on the basis of the temperature difference between the ambient temperature and the temperature of the control valve. In these embodiments, control unit 6 and/or control unit 20 may be configured to output a signal that indicates the degree of the leakage to leakage monitoring system 24.

INDUSTRIAL APPLICABILITY

The industrial applicability of the systems and methods disclosed herein will be readily appreciated from the foregoing discussion. One exemplary application is an application in a mining system, for example, in a self-advancing roof support system of an underground mining system. In particular, a unit comprising a control valve 2, an associated temperature sensor 12 and, optionally, other components may be configured to be installed in the mining system. In this manner, existing systems can also be retrofitted with the leakage detection system of the present disclosure. Further, it will be appreciated that the disclosed hydraulic assembly and leakage detection system can also be used in other applications in order to detect a leakage in a hydraulic control valve used for controlling a hydraulic function of a hydraulic system.

The exemplary hydraulic assemblies disclosed herein may be used to determine a leakage occurring in one of a plurality of hydraulic control valves 2 in the following manner.

A temperature of each control valve 2 may be detected using an associated temperature sensor 12. Further, an ambient temperature that is not influenced by the temperatures of the control valves 2 is detected by an ambient temperature sensor 22 (or by control valve ambient temperature sensors 32 associated with each control valve 2). The ambient temperature is compared to the temperatures of the control valves 2, and it is determined that a leakage has occurred in at least one control valve 2 when a temperature difference between the temperature measured by the associated temperature sensor and the ambient temperature is greater than a predetermined first threshold. Alternatively or additionally, the temperatures are compared at regular intervals, and it is determined that a leakage has occurred when an average increase of the temperature difference is greater than the predetermined second threshold. The results of the determination and, optionally, information indicating which control valve 2 has a leakage, if any, is communicated to leakage monitoring system 24, where it may be displayed to an operator in order to allow replacement of the defective control valve.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the scope of disclosure more generally. All methods described herein may perform in any suitable order unless otherwise indicated herein or clearly contradicted by context.

Accordingly, this disclosure includes all modifications and equivalences of the subject-matter recited in the claims appended hereto as permitted by applicable law. Moreover, any combination of the above-described elements in all possible variations thereof is encompassed by the disclosure unless otherwise indicated herein or clearly contradicted by context.

Although the preferred embodiments of this disclosure have been described herein, improvements and modifications may be incorporated without departing from the scope of the following claims.

The invention claimed is:

1. A hydraulic assembly for a mining system, comprising:
   at least one control valve for controlling a supply of hydraulic fluid to a hydraulic actuator of the mining system;
   at least one temperature sensor associated with the at least one control valve, the at least one temperature sensor being configured to measure a temperature of the at least one control valve; and
   a control unit in communication with the at least one temperature sensor, the control unit being configured to:
      receive the temperature measured by the at least one temperature sensor; and
      determine that a leakage has occurred in the at least one control valve based on the temperature,
   wherein the at least one control valve and the at least one temperature sensor are configured to be disposed in a valve block of the mining system, the at least one temperature sensor being thermally coupled to the at least one control valve via at least one of a thermally conductive material forming the valve block, or a thermally conductive connection element,
   wherein the at least one control valve includes a plurality of control valves, and the at least one temperature sensor is associated with two or more of the plurality of control valves.

2. The hydraulic assembly of claim 1, wherein the control unit is further configured to obtain an ambient temperature; and
   determine that the leakage has occurred based on a comparison of the temperature measured by the at least one temperature sensor and the ambient temperature.

3. The hydraulic assembly of claim 2, wherein the control unit is further configured to determine that the leakage has occurred in the at least one control valve when a temperature difference between the temperature measured by the at least one temperature sensor and the ambient temperature is greater than a first threshold.

4. The hydraulic assembly of claim 2, wherein the control unit is configured to determine that the leakage has occurred when an average increase of a temperature difference measured over time is greater than a predetermined second threshold, the temperature difference being a difference between the temperature measured by the at least one temperature sensor and the ambient temperature.

5. The hydraulic assembly of claim 1, further comprising an ambient temperature sensor associated with the control unit, the ambient temperature sensor being configured to measure the ambient temperature and communicate the ambient temperature to the control unit.

6. The hydraulic assembly of claim 1, wherein the at least one control valve includes a plurality of control valves, and the at least one temperature sensor includes a plurality of temperature sensors, each of the plurality of temperature sensors being associated with a corresponding one of the plurality of control valves.

7. The hydraulic assembly of claim 1, wherein the at least one control valve and the at least one temperature sensor are configured as a replaceable unit configured to be installed in the valve block.

8. The hydraulic assembly of claim 1, wherein the control unit includes a first control unit associated with the at least one control valve, the first control unit being configured to:
   actuate the at least one control valve to control the supply of hydraulic fluid to the hydraulic actuator; and
      communicate an output signal to a second control unit when the first control unit determines that the leakage has occurred.

9. The hydraulic assembly of claim 8, wherein the first control unit, the at least one control valve, and the at least one temperature sensor are integrated in a control valve assembly configured to be installed in the mining system.

10. The hydraulic assembly of claim 9, wherein the control valve assembly further includes a control valve ambient temperature sensor configured to detect an ambient temperature in a vicinity of the at least one control valve, the first control unit being configured to determine that the leakage has occurred based on a comparison of the temperature detected by the at least one temperature sensor and the ambient temperature detected by the control valve ambient temperature sensor.

11. The hydraulic assembly of claim 9, wherein the control valve assembly further includes a power supply configured to supply electric power to the first control unit, an actuator of the at least one control valve, the at least one temperature sensor, and the control valve ambient temperature sensor.

12. The hydraulic assembly of claim 1, wherein the control unit is configured to communicate information identifying the at least one control valve having the leakage to a leakage monitoring system, the information including, at least one of a location of the at least one control valve, the type of the at least one control valve, a serial number of the at least one control valve, or another identifier allowing identification of the at least one control valve.

13. The hydraulic assembly of claim 1, wherein the thermally conductive material has a higher thermal conductivity than the material forming the valve block.

14. The hydraulic assembly of claim 1, wherein the material of the thermally conductive element includes at least one of copper, aluminium, or thermal paste.

* * * * *